(12) United States Patent
Huck

(10) Patent No.: US 11,146,633 B2
(45) Date of Patent: Oct. 12, 2021

(54) METHOD FOR PRODUCING A BIDIRECTIONAL CONNECTION BETWEEN A DEVICE FORMING A FIELD DEVICE AND AN APPLICATION IN A CENTRAL FACILITY

(71) Applicant: Siemens Aktiengesellschaft, Munich (DE)

(72) Inventor: Ralf Huck, Großkrotzenburg (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 16/742,048

(22) Filed: Jan. 14, 2020

(65) Prior Publication Data

US 2020/0228601 A1 Jul. 16, 2020

(30) Foreign Application Priority Data

Jan. 16, 2019 (EP) .................................... 19152018

(51) Int. Cl.
*H04B 10/11* (2013.01)
*H04B 1/00* (2006.01)
*H04L 29/08* (2006.01)
*H04W 4/80* (2018.01)
(Continued)

(52) U.S. Cl.
CPC ........... *H04L 67/1095* (2013.01); *H04W 4/80* (2018.02); *H04W 76/10* (2018.02); *H04W 88/04* (2013.01)

(58) Field of Classification Search
CPC .... H04B 1/005; H04B 1/0053; H04B 1/0067; H04B 1/0075; H04B 10/1123; H04B 10/1143; H04B 10/2589; H04W 4/80; H04W 76/10; H04W 88/04; H04L 67/1095; G05B 19/41855
See application file for complete search history.

(56) References Cited

U.S. PATENT DOCUMENTS 7,504,941 B1 * 3/2009 Taskin ................ H04L 12/4625
370/401
9,253,632 B2 * 2/2016 Griffin .................. H04W 12/63
(Continued)

FOREIGN PATENT DOCUMENTS

DE 102016107045 10/2017
WO WO2016/136670 11/2017

OTHER PUBLICATIONS

EP Search Report dated Jul. 18, 2019 based on EP19152018 filed Jan. 16, 2019.

*Primary Examiner* — Andrew Wendell
(74) *Attorney, Agent, or Firm* — Cozen O'Connor

(57) ABSTRACT

Method for producing a bidirectional connection between a device forming a field device and an application in a central facility, wherein a bidirectional connection is produced between the device that forms the field device and the application in a central facility, where a bridge function running on a mobile communication terminal establishes a short-range radio connection with the device, establishes a long-range radio connection with the application in the central facility and establishes a data channel for bidirectional communication between the application in the central facility via the long-range radio connection and the device via the short-range radio interface.

13 Claims, 2 Drawing Sheets

(51) Int. Cl.
*H04W 76/10* (2018.01)
*H04W 88/04* (2009.01)

(56) References Cited

U.S. PATENT DOCUMENTS

| | | | |
|---|---|---|---|
| 2012/0069827 A1* | 3/2012 | Lee .................... | H04W 52/0274 370/338 |
| 2012/0201213 A1* | 8/2012 | Banerjea ............. | H04W 72/044 370/329 |
| 2014/0220884 A1* | 8/2014 | Ganesan ............. | H04B 5/0031 455/7 |
| 2015/0170145 A1* | 6/2015 | Patel ....................... | G06F 8/654 705/44 |
| 2015/0173156 A1* | 6/2015 | Pedersen ................ | G01J 1/0219 315/151 |
| 2015/0199169 A1* | 7/2015 | Manley ................. | G06F 13/387 710/106 |
| 2016/0269828 A1* | 9/2016 | Smith ....................... | H04R 3/14 |
| 2017/0366402 A1* | 12/2017 | Vetrovsky ............ | H04L 41/0893 |
| 2018/0026840 A1 | 1/2018 | Toepke et al. | |
| 2018/0027025 A1* | 1/2018 | Ma ....................... | H04W 12/062 726/7 |
| 2020/0344821 A1* | 10/2020 | Padaki ................. | H04W 56/001 |

* cited by examiner

METHOD FOR PRODUCING A BIDIRECTIONAL CONNECTION BETWEEN A DEVICE FORMING A FIELD DEVICE AND AN APPLICATION IN A CENTRAL FACILITY

BACKGROUND OF THE INVENTION

1. Field of the Invention

The invention relates to a method for producing a bidirectional connection between a device forming a field device and an application in a central facility.

2. Description of the Related Art

In automated process installations, field devices are used to capture and/or influence process parameters (process variables). In this context, process parameters, such as fill level, flow rate, pressure, temperature or pH value of measuring transducers (sensors), are captured, while actuators, such as valves or pumps for example, are used to influence process variables, e.g., the flow rate of a liquid in a pipeline section or the fill level in a container.

In addition to the data immediately required for the process control or regulation (e.g., measurement values), field devices generate many items of additional information, which make it possible to continuously optimize processes and avoid unplanned installation shutdowns, for example, by way of predictive maintenance based on diagnostic data from the field devices.

When parameterizing field devices in an installation, there is the requirement that, in addition to the changed data in the device, the corresponding data held centrally, e.g., in a server or a cloud, is also changed consistently.

In many applications, field devices are only linked to controllers or control systems via analog input/output maps. Consequently, these are not able to access the digital data of the field devices and pass it on to the central facility. The data of battery-operated devices also cannot be passed on to a central server without further auxiliary resources, because these devices are not connected to the central server via an electrical line or a long-range radio connection.

In both cases, the data can therefore only be read on site via a parameterization tool and an electrical point-to-point service interface or a short-range radio interface of the device. In multi-user applications, however, it would be advantageous if the data could be reconciled with a database on a central server at any time. Conventional systems of this kind (e.g., PDM Maintenance Station), however, require a data-based connection between the central server and the field device. Particularly in brownfield installations, however, the corresponding infrastructure is often not available, and a retrofit would be highly expensive, e.g., by installing a radio-based infrastructure in parallel or subsequently installing HART multiplexers/gateways.

In the broadest application, the digital data may involve measurement values or diagnosis, calibration, configuration or parameterization data of the devices.

One possible solution for the problem described would be the modernization of the input/output level by replacing purely analog modules with modules with additional digital communication options (e.g., HART communication) or retrofitting all input/output maps with HART multiplexers for reading the data in parallel. Both are associated with high costs and, in the first mentioned case, with an installation shutdown (production stoppage) for the installation operator.

One alternative would be to retrofit all field devices with a radio interface (second data channel) and to build a radio-based infrastructure with fixed-location access points, lines or repeaters and gateways. In widely distributed installations, a radio-based infrastructure of this kind can be highly expensive and may even become impossible should there be a lack of suitable energy sources for supplying the additionally required components.

SUMMARY OF THE INVENTION

It is an object of the invention to provide a method, which in a simple manner, enables a temporary bidirectional data exchange between a device that forms a field device and a central facility, so that it is always possible for the data held centrally to be consistently changed when the data in the individual devices is changed.

This and other objects and advantages are achieved in accordance with the invention by a method for producing a bidirectional connection between a device, in particular a field device, and an application in a central facility via a bridge function running on a mobile communication terminal, which establishes a short-range radio connection with the device, establishes a long-range radio connection with the application in the central facility and establishes a data channel for bidirectional communication between the application in the central facility via the long-range radio connection and the device via the short-range radio interface.

Eligible mobile communication terminals include smartphones, tablet computers, laptops or other suitable consumer devices, for example.

The short-range radio connection between the communication terminal and the device to be parameterized may, for example, occur in accordance with the Bluetooth standard or another standard supported by the communication terminal.

The bridge function may run autonomously in the background on the mobile communication terminal and automatically establish the short-range radio connection with the device or a plurality of devices, as soon as the communication terminal is located in the radio range of the device or the devices. The devices currently located in radio range may each be displayed automatically on the communication terminal, so that the user can select, from the displayed devices, the device provided for the data exchange with the central unit in each case.

The long-range radio connection between the communication terminal and the central facility may occur in accordance with a mobile radio standard, e.g. Global System for Mobile Communications (GSM), or via Wireless Local Area Network (WLAN) and a wireless access point of the central facility. Here too, the long-range radio connection with the application can be established automatically, as soon as the communication terminal is located in radio range of the wireless access point. The central facility may, e.g., involve a local server or a cloud.

As soon as the short-range radio connection with the device and the long-range radio connection with the central facility exists, the bridge function can produce the data channel for the bidirectional communication between the application in the central facility and the device. In order to display or modify data of the device with the aid of the central application, such as to read diagnosis data, parameter data or calibration data from the device or transfer parameter or calibration data into the device and change it there, it is possible for the application to be accessed via a browser contained in the mobile communication terminal over the long-range radio connection. In this context, the browser and the bridge function represent two mutually independent functions that operate in parallel. A parameterization tool in the form of the central application is accessed via the browser. Consequently, no unique parameterization function is needed on the mobile communication terminal itself.

By exclusively accessing only a central application and via the bidirectional data exchange over the data channel, a permanently consistent data retention is achieved between the device and the application in the central facility, i.e., when data is changed in individual devices, the centrally held data is always also changed accordingly.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is described below on the basis of an exemplary embodiment and with reference to the figure in the drawings, in which.

DETAILED DESCRIPTION OF THE EXEMPLARY EMBODIMENTS

Figure 1:
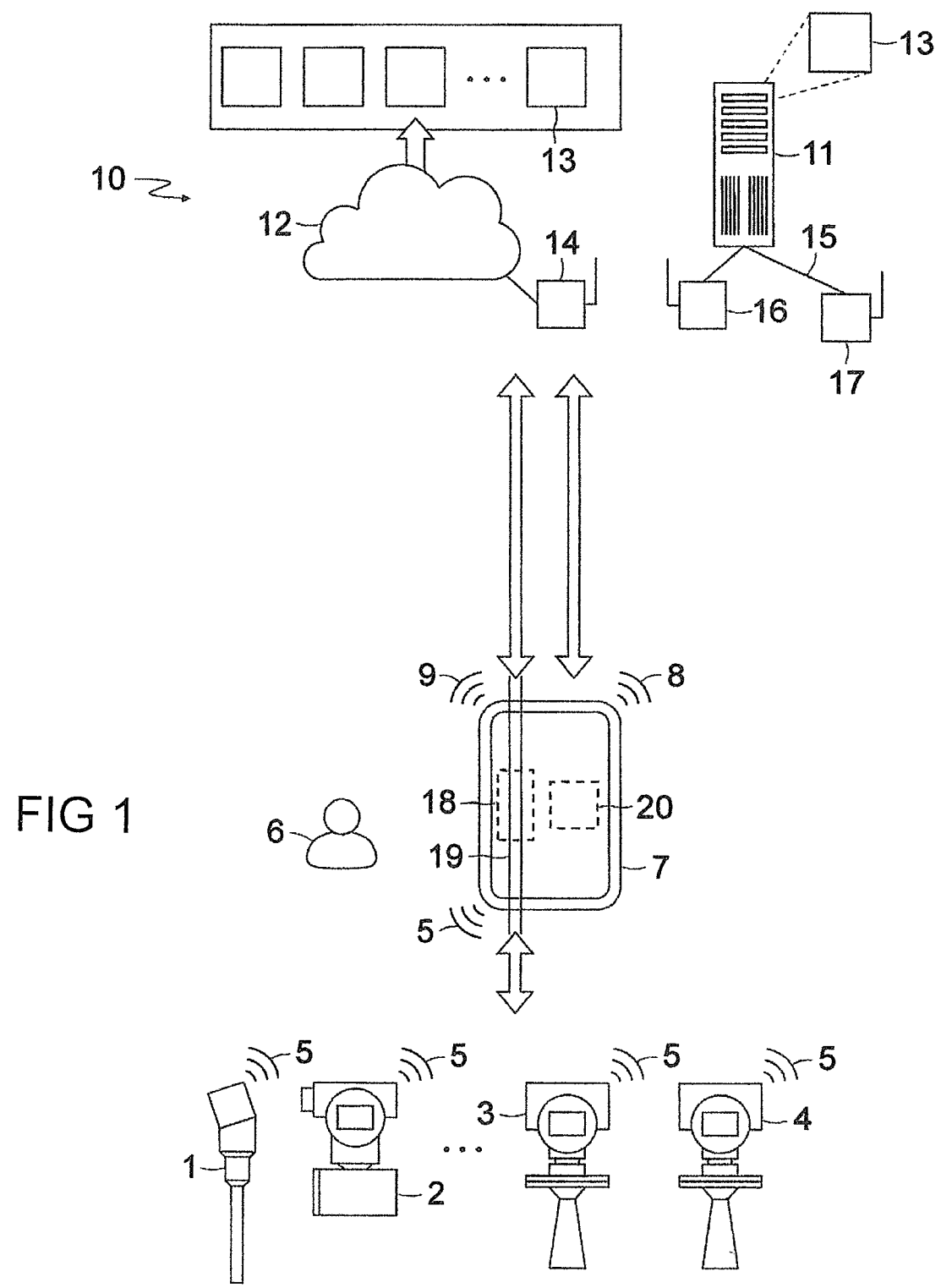
FIG. 1 is a schematic block diagram illustrating field devices distributed in a process installation in accordance with the invention.

FIG. 1 shows several field devices 1, 2, 3, 4, as are present in a large number in a process installation and are often widely distributed. The devices 1, 2, 3, 4 have radio interfaces, which enable short-range radio connections 5 in accordance with Bluetooth or the Near-Field Communication (NFC) standard. A technician 6 located in the installation is equipped with a mobile communication terminal 7, such as a smartphone, tablet or other mobile with comparable functions, which possesses wireless communication options (radio interfaces) such as Bluetooth or NFC 5, WLAN 8 and mobile radio (GSM) 9.

Contained in a central facility 10, which may involve a local server 11 or a cloud 12, is an application 13 for the parameterization of the field devices 1, 2, 3, 4. The access to the application 13 in the cloud 12 may occur directly via mobile radio 9 or indirectly via WLAN 8 and a wireless access point 14 with cloud connectivity. The local server 13 can be reached via WLAN 8 and is connected to distributed wireless access points 16, 17 via a local network 15.

The mobile communication terminal 7 contains a bridge function 18 that executes in the background and is configured to automatically establish a short-range radio connection 5 with the field device 3, for example, and a WLAN connection 8 or mobile radio connection 9 with the application 13 in the central facility 10 and subsequently to produce a bidirectional data channel 20 between the field device 3 and the application 13 in the central facility 10. The data channel 20 involves a temporary connection executing in the background of the communication terminal 7. The mobile communication terminal 7 further contains a browser 20, which makes it possible for the user 6 to access the application 13 and parameterize the field device 3 via the application 13 and the data channel 20. The communication terminal therefore does not require its own parameterization function. By exchanging data via the bidirectional data channel 20, it is ensured that the parameter data is consistent in the application 13 and in the field device 5. The browser 20 and the bridge function 18 thus represent two mutually independent functions of the mobile communication terminal 7 that operate in parallel. The communication terminal 7 with the browser-based access to the central application 13 can therefore then also be used when a connection between the application 13 and the device does not yet exist.

The bridge function 18 for establishing the parallel data channel 19, which executes in the background on the mobile communication terminal 7, and the browser 20, for example, have the following functionality in connection with the application 13 in the central facility 10:

a) Automatically temporarily establish a connection via the bridge function 18 with the short-range radio interface of one of the field devices 1, 2, 3, 4, as soon as the communication terminal 7 is located in the range of the corresponding device, e.g., 3. Should the field device not possess a radio interface, then initially an electrical point-to-point connection with the communication terminal 7 and a suitable modem can be produced.

b) Automatically establish a connection, via the bridge function 18, to the application 13 in the central facility 10, e.g., in the local server 11 via WLAN 8 or in the cloud 12 via mobile radio 9.

c) Automatically establish the data channel 19 for bidirectional communication between the application 13 in the central facility 10 via WLAN 8 or mobile radio 9 and a service interface of the field device 3 via the short-range radio interface 5 or, optionally, the electrical point-to-point connection explained above.

d) Report the field devices (e.g. 2, 3 and 4) which can be reached temporarily and bidirectionally and which are discovered by the bridge function 18 executing in the background at the same time as the central application 13.

e) Enable the access to the application 13 for device parameterization by the user 6 via the browser 20 and the WLAN 8 or mobile radio connection 9. On his communication terminal 7, for example, the user 6 can i. Select a field device, e.g. 3, from the list of the field devices 2, 3 and 4 temporarily connected to the communication terminal 7, ii. View measurement values or diagnose, calibration, configuration or parameterization data of the temporarily connected field device 3 on the cloud-based or server-based application 13 and, optionally, compare these with archived data discovered in the device 3, iii. Modify data in a cloud-based or server-based database via the application 13 (e.g., by manually changing individual data items or reactivating archived data records)

iv. Cause synchronization of the data between the central facility 10 and the field device 3 by uploading or downloading via the data channel 19.

Unlike a previous direct point-to-point connection between a parameterization device and the field device 3, the connection now takes place indirectly via the central facility 10 (local server 11 or cloud 12) and, from there, back to the field device 3 again. The connection (data channel 19) exists in the background and only temporarily. This has the following advantages:

This involves a purely software-based solution for communication with devices that themselves do not need to be connected to a digital network permanently.

The available tool infrastructure is used, so that no investments in new hardware are required.

There is no intervention in the input/output level of the installation, which could lead to installation shutdowns/production stoppages.

The solution executes automatically in the background on a mobile communication terminal, so that no manual interventions are required on the field devices, if these possess a radio interface. Otherwise, it is merely necessary for an electrical point-to-point connection with the corresponding device to be established for a brief time. The bidirectional data channel between server/cloud and field device is then also established automatically.

The solution is multi-user-capable, i.e., it is possible to operate in parallel with a plurality of mobile communication terminals (browsers), without the data consistency being lost, because all users work on the same database.

Read access to the entire data pool of the installation is possible, i.e., not only the data that can be reached by the point-to-point connection.

For the function executing in the background for establishing the bidirectional communication, only low computing power is required.

In addition to the simple browser with access to a central parameterization tool, no additional parameterization tool is required on the mobile communication terminal. This means that the solution can be realized on all types of smartphones or tablets.

Figure 2:
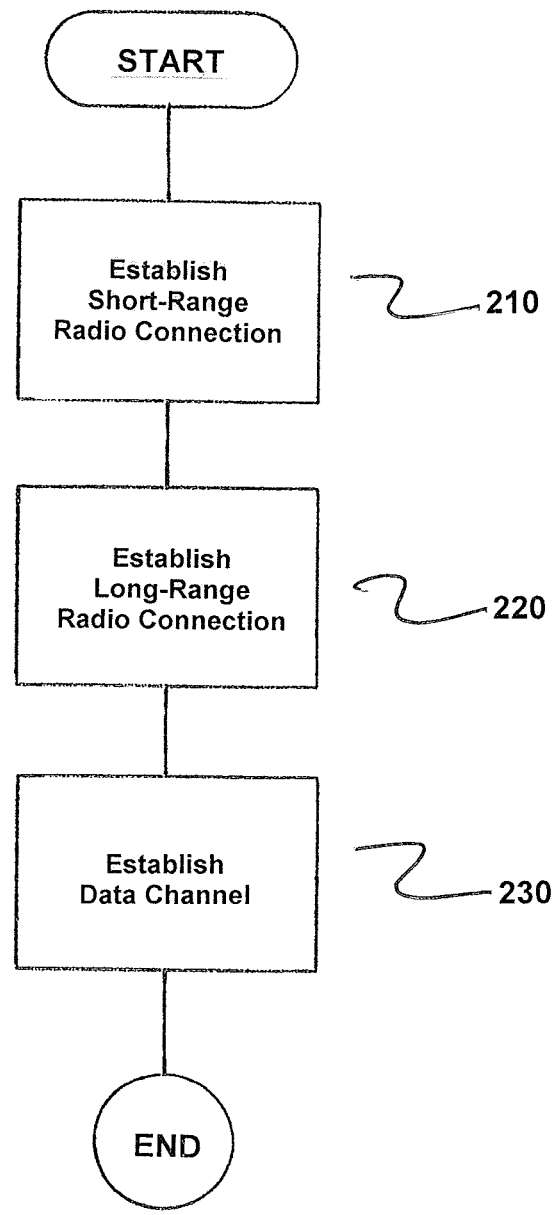
FIG. 2 is a flowchart of the method in accordance with the invention.

FIG. 2 is a flowchart of a method for establishing a bidirectional connection 19 between a device 1, 2, 3, 4 and an application 13 in a central facility 10 via a bridge function 18 executing on a mobile communication terminal 7. The method comprises establishing a short-range radio connection 5 with the device 1, 2, 3, 4, as indicated in step 210.

Next, a long-range radio connection 8, 9 is established with the application 13 in the central facility 10, as indicated in step 220.

Next, a data channel 19 for bidirectional communication is established between the application 13 in the central facility 10 via the long-range radio connection 8, 9 and the device 1, 2, 3, 4 via the short-range radio interface 5, as indicated in step 230.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for establishing a bidirectional connection between a device and an application in a central facility via a bridge function executing on a mobile communication terminal, the method comprising:
   establishing, by the bridge function executing on the mobile communication terminal, a short-range radio connection with the device;
   establishing, by the bridge function executing on the mobile communication terminal, a long-range radio connection with the application in the central facility; and
   establishing, by the bridge function executing on the mobile communication terminal, a data channel for bidirectional communication between the application in the central facility via the long-range radio connection and the device via the short-range radio interface;
   wherein devices located in radio range are automatically displayed by the bridge function executing on the communication terminal.

2. The method as claimed in claim 1, wherein the short-range radio connection occurs in accordance with one of Bluetooth, Near-Field Communication (NFC) standard and the ZigBee standard.

3. The method as claimed in claim 1, wherein one of (i) the short-range radio connection with the device and (ii) a plurality of devices is established as soon as the communication terminal is located in radio range of the device or the plurality of devices.

4. The method as claimed in claim 2, wherein one of (i) the short-range radio connection with the device and (ii) a plurality of devices is established as soon as the communication terminal is located in radio range of the device or the plurality of devices.

5. The method as claimed in claim 1, wherein the long-range radio connection occurs in accordance with a mobile radio standard.

6. The method as claimed in claim 1, wherein the long-range radio connection occurs via a wireless access point of the central facility.

7. The method as claimed in claim 2, wherein the long-range radio connection occurs via a wireless access point of the central facility.

8. The method as claimed in claim 3, wherein the long-range radio connection occurs via a wireless access point of the central facility.

9. The method as claimed in claim 6, wherein the long-range radio connection with the application is established automatically as soon as the communication terminal is located in radio range of the wireless access point.

10. The method as claimed in claim 1, wherein the bridge function executes autonomously as a background function.

11. The method as claimed in claim 1, wherein in order to at least one of (i) change and (ii) display data of the device connected via the data channel to the application in the central facility in each case, the application is accessed via a browser contained in the mobile communication terminal over the long-range radio connection and one of (i) data is changed via said application and loaded over the data channel into the connected device and (ii) data is read from the device over the data channel and displayed.

12. The method as claimed in claim 11, wherein a permanently consistent data retention is achieved between the device and the application in the central facility by exclusively accessing only a central application and by exchanging data via the data channel.

13. The method as claimed in claim 1, wherein the device comprises a field device.

* * * * *